United States Patent [19]

Tomohisa et al.

[11] Patent Number: 4,672,463

[45] Date of Patent: Jun. 9, 1987

[54] METHOD FOR EMPHASIZING SHARPNESS IN PICTURE SCANNING RECORDING TIME IN A PICTURE REPRODUCING MACHINE

[75] Inventors: Kunio Tomohisa; Masamichi Cho; Yasuo Kurusu, all of Kyoto, Japan

[73] Assignee: Dainippon Screen Mfg. Co., Ltd., Kyoto, Japan

[21] Appl. No.: 828,141

[22] Filed: Feb. 7, 1986

[30] Foreign Application Priority Data

Apr. 5, 1985 [JP] Japan .................................. 60-71132

[51] Int. Cl.⁴ ............................................. H04N 1/40
[52] U.S. Cl. .................................... 358/284; 358/282; 382/54
[58] Field of Search ....................... 358/284, 280, 282; 382/54

[56] References Cited

U.S. PATENT DOCUMENTS 4,517,607  5/1985  Ohkoucki et al. .................. 358/284
4,612,584  9/1986  George .............................. 358/284

Primary Examiner—Edward L. Coles, Sr.
Attorney, Agent, or Firm—Hayes, Davis & Soloway

[57] ABSTRACT

In a method for emphasizing sharpness in picture scanning recording time in a picture reproducing machine a central picture signal obtained by scanning an original picture according to the scanning sequence and peripheral picture signals of the central picture signal which are appropriately weighted are added to the central signal and averaged to obtain vignette signals, and they are appropriately calculated for emphasizing sharpness of the picture signal. In the method as the peripheral picture signals desired numbers of continuous picture signals are selected by centering the central signal in the main scanning and the sub-scanning directions independently.

2 Claims, 12 Drawing Figures

FIG. 7

(a) LINE PATTERN ORIGINAL (BOTH MAIN AND SUB-SCANNING DIRECTION)

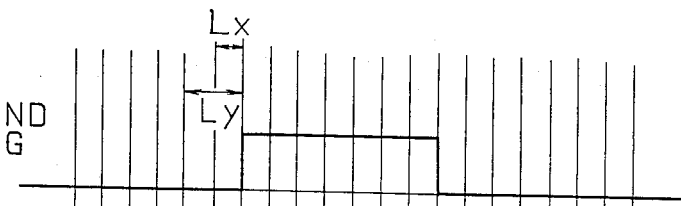

(b) Nx=7 SHARPNESS EMPHASIZING SIGNAL OF A COMPONENT IN THE MAIN SCANNING DIRECTION (c) Ny=7 SHARPNESS EMPHASIZING SIGNAL OF A COMPONENT IN THE SUB-SCANNING DIRECTION

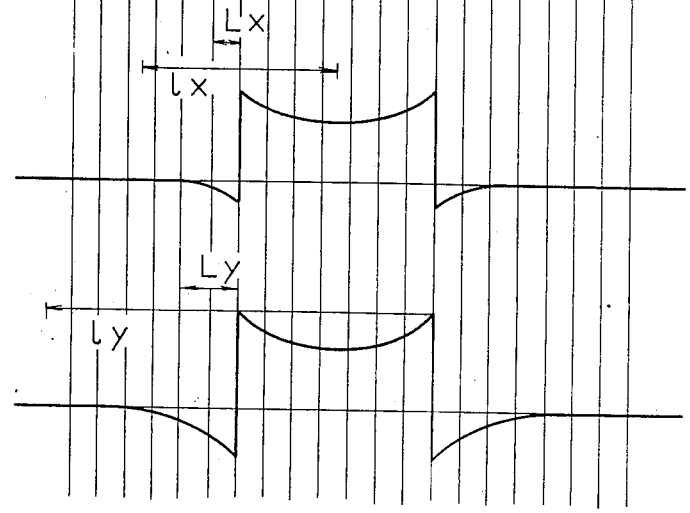

(d) Nx=11 SHARPNESS EMPHASIZING SIGNAL OF A COMPONENT IN THE MAIN SCANNING DIRECTION

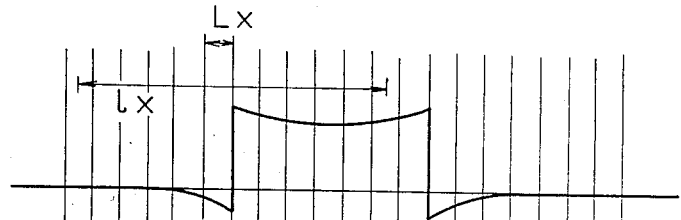

(e) Ny=5 SHARPNESS EMPHASIZING SIGNAL OF A COMPONENT IN THE SUB-SCANNING DIRECTION

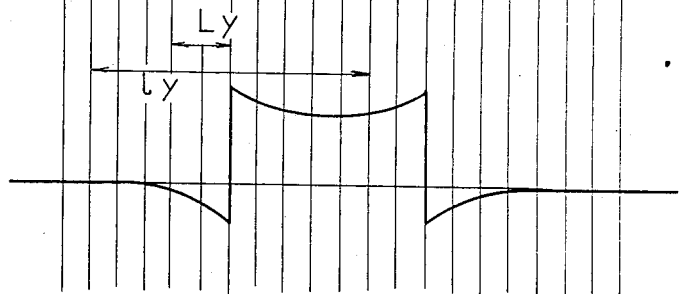

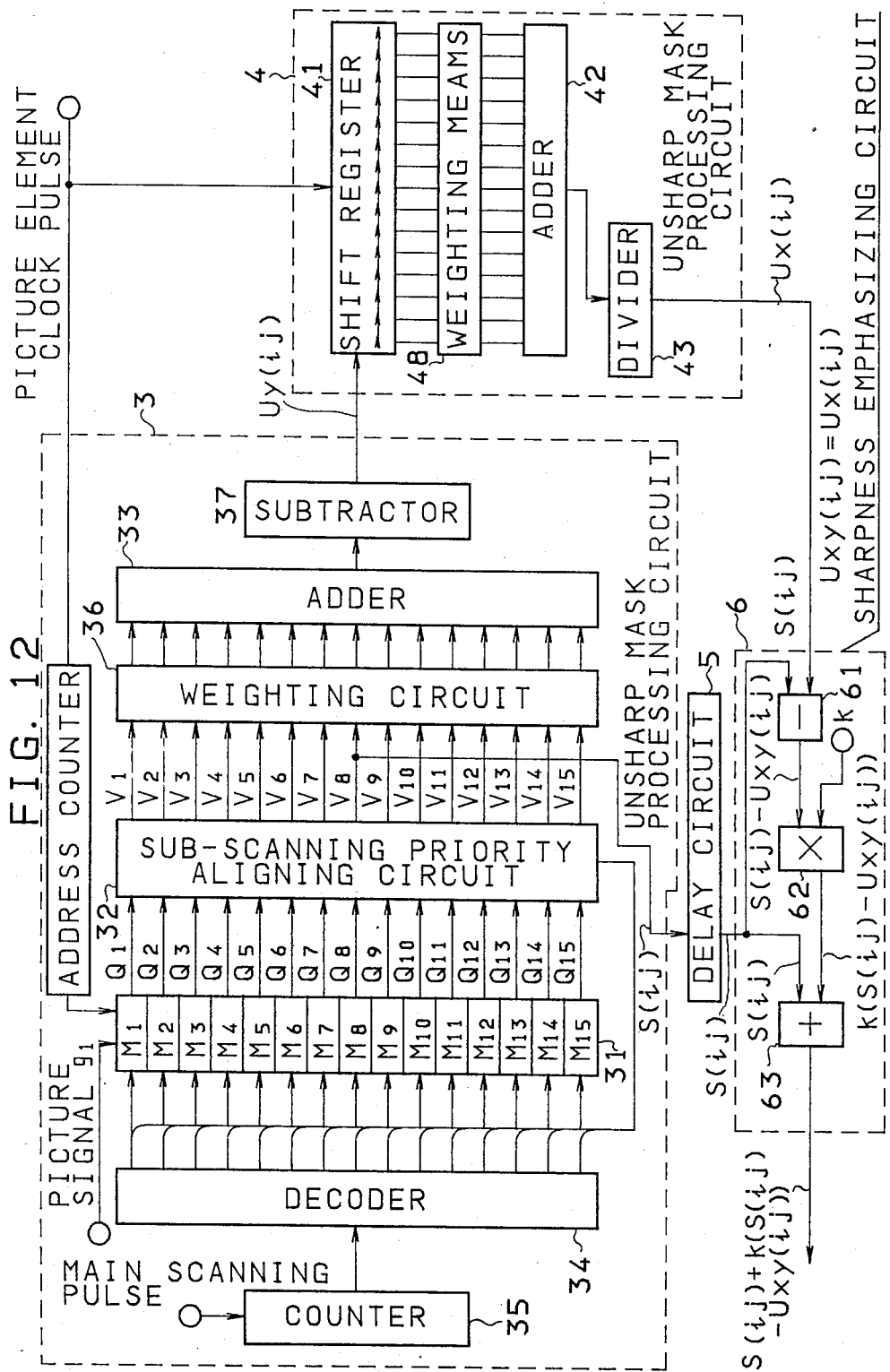

METHOD FOR EMPHASIZING SHARPNESS IN PICTURE SCANNING RECORDING TIME IN A PICTURE REPRODUCING MACHINE

BACKGROUND OF THE INVENTION

The present invention relates to a method for emphasizing sharpness of an image of an object to be electronically processed in the case of processing an original picture by a digital color scanner or the like and to an apparatus therefor.

PRIOR ART

One of the conventional techniques for emphasizing sharpness of a picture image comprising quantized picture element data (hereinafter, refer to pixel data) has been disclosed in the Japanese Patent Laid-Open Publication No. 59-141871 (hereinafter refer to the publication A).

The main part of the invention disclosed in the publication A is shown in FIG. 12.

In FIG. 12 an unsharp mask processing circuit 3 in the sub-scanning direction stores picture signals ($g_1$) of the same number of a plurality of lines in a main scanning line memory 31 in the main scanning direction, and from the main scanning line memory 31 all signals on identical main scanning positions of each of the lines are simultaneously read out. These all signals are processed simultaneously by a main scanning sequence arranging circuit 32, a weighting means 39, an adding means 33 and a dividing means 37, and from density information of a plurality of pixels arranging in the sub-scanning direction, picture signals ($U_y$) which are vignetted in the same direction are output. The picture signals ($U_y$) vignetted in the sub-scanning direction are input to a shift register 41 having a constant number of stages in the unsharp mask processing circuit 4 in the main scanning direction.

The shift register 41 outputs its holding contents in parallel according to each of stages therein to an addition circuit 42 through a weighting means 48.

The addition circuit 42 outputs the vignetted picture signals(s) ($U_x$) in the main scanning direction basing on density information of plurality of pixels arranging in the same scanning direction through the dividing means 43. Because this picture signals ($U_x$) were subjected previously a processing for converting the signals to vignetted signals ($U_y$) in the sub-scanning direction at the pre-stage, the signals become vignetted signals in the both directions (hereinafter, refer to unsharp signals) ($U_{xy}=U_x$), and then this vignetted signal ($U_{xy}$) is fed to a sharpness emphasizing circuit 6.

From a central line at an output side of the main scanning sequence arranging circuit 32 of the unsharp mask processing circuit 3 in the sub-scanning direction, a sharp picture signal (S(ij)) comprising a pixel train in question which is to be recorded is taken out, and this sharp picture signal (S(ij)) is fed to the sharpness emphasizing circuit 6 through a delay circuit 5.

The sharpness emphasized signal (S(ij) +k(S(ij)) −$U_{xy}$)) is fed to the recording part and recorded therein. A means for converting magnification in a picture processing machine by increasing or thinning out data has been disclosed in the Japanese Patent Laid-Open Publication No. 54-65601 (hereinafter, refer to publication B).

This magnification converting means disclosed in the publication B performs magnification reduction by thinning out quantized pixel data every desired number, and magnification multiplication is realized by overlapping the quantized pixel data ever desired number. In this means when magnification conversion processing is carried out, in usual, at the same time the afore-mentioned sharpness emphasizing processing is performed. Thus, the disclosed means reproduces, displays the desired picture in a CRT monitor and outputs the pixel data to a graphic printer etc.

In recent picture processing apparatus, when picture information is quantizedly processed, quantity of the picture data are finite under various restrictions. For example, in the case of applying CCD array sensors as input elements, since the number of the elements is constantly determined, when a direction along which the elements are aligned is decided to be the main scanning direction, resolving power in the main scanning direction is consequently defined, and in the case of carrying out digital processing by quantizing the input picture information by A/D conversion, from time relation between input and output etc. sampling time is determined in itself and corresponding to the sampling time the input resolving power is determined to be finite.

In the sub-scanning direction (a direction which is rectangular to the main-scanning direction), from processing speed, composition of an input optical system etc. the resolving power is determined. In such a picture information input system, for example, there is one of methods for converting magnification in which speed of recording output is set to be constant, in the main scanning direction of the input system the picture information is increased and/or thinning out according to magnification, and further by varying processing speed in the sub-scanning direction, magnification is varied in the output system.

In the above described magnification converting method, as shown in FIG. 6, resolving power in the main scanning direction is constant, irrespective of the magnification, and resolving power in the sub-scanning direction varies in response to magnification. Because of the afore-mentioned, size of one pixel of the input information on the original picture can not be a square, and when the sharpness emphasizing means which generates vignette signals in both of the main scanning and the sub-scanning directions from a constant appropriate value(s) disclosed in the publication A, degree of sharpness emphasis is different in the both scanning directions from each other, which results in impossibility of giving proper sharpness emphasis which is adequately balanced in the both scanning directions (refer to FIGS. 7(b) and (c) which are hereinafter described).

SUMMARY OF THE INVENTION

It is an object of the present invention to provide a method for properly emphasizing sharpness of a picture signal in both main scanning and sub-scanning directions in digital picture image processing apparatus such as a reproduction scanner, a facsimile, a graphic printer, a CRT graphic monitor etc. which scan an original picture, perform sharpness emphasis processing of the picture signal and output it to record, in the case of converting magnification of a picture image to that of the original picture and recording or displaying picture images by performing halftone processing and/or linear picture processing.

It is another object of the present invention to provide a method capable of obtaining the optimum mask size in reproducing a picture image.

In the present invention, for example, when a magnification converting method in which resolving power in the main scanning direction at the input system is defined to be constant, and in the sub-scanning direction resolving power is varied according to the magnification is applied, processing in the main scanning direction at the output system is carried out by thinning out or increasing the picture signal, while in the sub-scanning direction the picture signal must be output with a constant speed, so that largeness of one pixel on the original picture in a signal obtained by scanning the picture at the input system differs, as shown in FIG. 6, in the main scanning direction and in the sub-scanning direction. Because the above described reason, adequate values of the number of pixels in the both main and sub-scanning directions for composing vignette signals to make sharpness emphasizing signals are obtained respectively.

Accordingly, it is another object of the present invention to provide a method for obtain a vignette signal so that largeness of one pixel in the sub-scanning direction is equal to that of in the main scanning direction.

According to this method, by independently establishing an adequate largeness of the vignette signal for generating the sharpness emphasizing signal(s) determined from the screen ruling in an output halftone plate or line drawing processing etc. independently on both the main scanning direction and the sub-scanning direction is obtained.

BRIEF DESCRIPTION OF THE DRAWINGS

FIG. 7 is a view illustrating a fixed unsharp mask size and a variable unsharp mask size in 50% magnification;

FIG. 12 is a view for illustrating the conventional apparatus.

DETAILED DESCRIPTION OF THE PREFERRED EMBODIMENTS

Prior to describing embodiments, we explain the principle of the present invention.

In general, operation formula for sharpness emphasis is represented, as shown in FIG. 12 and having been disclosed in the publication A, as follows. That is, $$S'(ij) = S(ij) + k(S(ij) - U_{xy}(ij)) \quad (1)$$

S'(ij): sharpness emphasizing signal (sharpness signal)
S(ij): central pixel signal (sharp signal)
$U_{xy}(ij)$: vignette signal (unsharp signal)
k: degree of emphasis (arbitrary coefficient)

Figure 6:
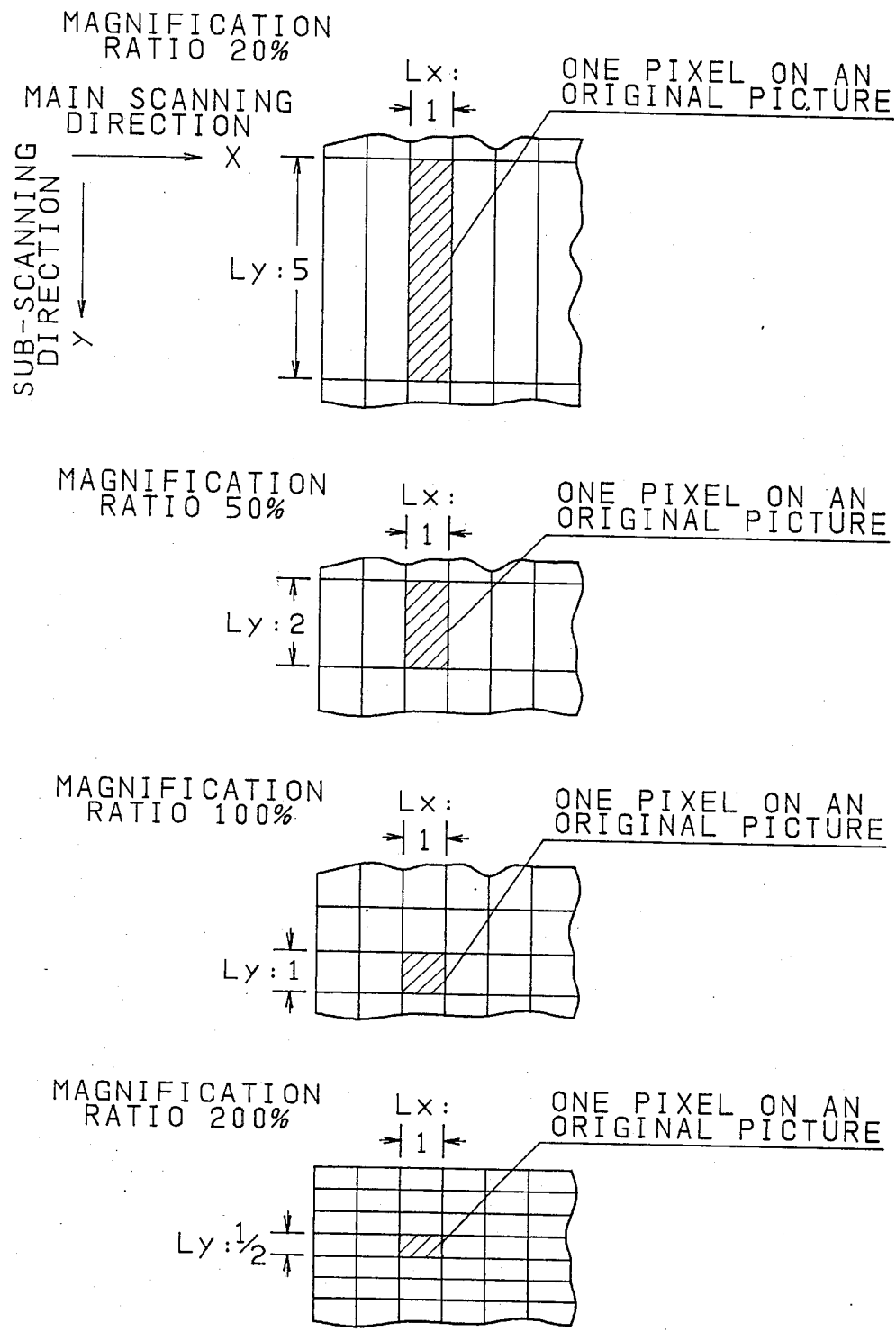
FIG. 6 is a configuration view of pixels showing an example of variation of resolving power occurred by variableness of the original picture in the sub-scanning direction with magnification correspondent manner.

Next, in a magnification converting method in which speed of output processing is constant, resolving power in the main scanning direction of the input system is also constant, while resolving power in the sub-scanning direction of the input system varies according to magnification, relations between a quantized pixel and resolving power and magnification of a scanning means in the case of the pixel being quantized are shown in FIG. 6. That is, when the resolving power in the main scanning direction of the input system in $R_{in}$ (line/mm), both resolving powers in the main scanning and the sub-scanning directions of the output system are $R_{out}$ (line/mm) and magnification is M %, lengths of sides of one pixel on the original picture, that of in the main scanning direction (X direction) being $L_x$(mm) and that of in the sub-scanning direction being $L_y$(mm), are obtained according to the following expressions; that is, $$L_x = 1/R_{in} \quad (2)$$

$$L_y = (100/M) \times (1/R_{out}) \quad (3)$$

Here, largeness of mask size of the vignette signal(s) made by a digital filtering circuit (for example, the circuits 3, 4 shown in FIG. 1) can be obtained merely in the order of the quantized pixel unit, accordingly, in the case of the number of pixels in the main scanning direction being $N_x$ (integer), and that of pixels in the sub-scannig direction being $N_y$ (integer), each of lengths of the mask sizes in the respective scanning directions lx and ly can be represented by the following expressions.

$$lx \times L_x \times N_x \quad (4)$$

$$ly \times L_y \times N_y \quad (5)$$

It is known that the mask lengths lx and ly are, in general, determined to the optimum sizes even basing on the screen ruling of the reproduction halftone plate, the line drawings etc.

$$lx \text{ or } ly = f(p) \quad (6)$$

p: length of a halftone plate screen pitch
f: optimum mask size length function

Here, an important matter is that for reproducing picture images in various kinds of magnification converting methods, for reproducing halftone screen plate picture images having various screen pitches or in reproducing line drawings, there is necessity for the mask size being made to be variable so that it may be the optimum one.

In usual sharpness emphasizing processing, it is preferable to determine the mask size lengths x and y in the main scanning and the sub-scanning directions represented in the expressions 4 and 5 as follows;

$$lx = L_x \times N_x = L_y \times N_y = ly \quad (7)$$

and it is also preferable to define the number of pixels $N_x$ and $N_y$ (integers) so that the mask size lengths, lx and ly, may be equal with each other. However, it is impossible to obtain all integers of $N_x$ and $N_y$ which meet over the whole magnification range, so that, here, the following restrictions are established for the purpose of defining integers $N_x$ and $N_y$ which satisfy the restrictions.

$$h = ly/lx = (L_y \times N_y)/(L_x \times N_x) \quad (8)$$

$$h_1 \leq h \leq h_2 \quad (9)$$

h: ratio of mask size length in the sub-scanning direction to mask size length in the main scanning direction $h_1$: the lower limit of h $h_2$: the upper limit of h Here, $h_1$ and $h_2$ are limitation which limits a range of the ratio of the mask size length ly in the sub-scanning direction to the mask size length lx in the main scanning direction, and values of them are defined so that difference between sharpness effects in the main and the sub-scanning directions may not be remarkably noticeable.

In addition, conditions in the expression (9), in the case of establishing a mask size of a square, are to find a combination of $N_x$ and $N_y$ so that h may be the closest value to 1 (unity). For example, when both resolving powers at the output and the input systems in the sub-scanning direction are 14.8 lines/mm (375 lines/inch) at magnification being 100%, of the optimum value of the sharpness emphasizing mask size length is determined to largeness of 7 pixels corresponding to the resolving power of the input system, the sharpness emphasizing mask size lengths in both the main and the sub-scanning directions are as follows;

$$25.4/375 \times 7 = 0.474(mm) \quad (10)$$

Here, in the case of magnification being 50%, magnitude of the resolving power in the sub-scanning direction is obtained from the expression (4) as follows;

$$Ly = 100/50 \times 1/14.8 = 0.135(mm),$$

and the mask size length lY in the sub-scanning direction is, $$ly = N_y \times L_y = 7 \times 0.135 = 0.945(mm) \quad (11)$$

Accordingly, for example, when an original line pattern picture is input and $N_x = N_y = 7$, the sharpness emphasizing signal in the main scanning direction is different from that of in the sub-scanning direction in their wave shapes. The manner of the above described are shown in FIGS. 7(b) and 7(c). FIG. 7(a) shows the line pattern original picture. In a Table 1 there is shown an example in which regarding each magnification, under a condition of magnification being 100%, by setting values of $N_x = 7$ and $N_y = 7$ as a reference so that the sharpness emphasizing mask sizes both in the main scanning and the sub-scanning directions may become equal to each other, and under restrictions of $h_1 = 0.9$ and $h_2 = 1.25$ in the expressions (8) and (9), the number of pixels $N_x$ in the main scanning direction and the number of pixels $N_y$ in the sub-scanning direction at various magnifications are set. Here, the range of h indicates a range of actual values of the ratio of the mask size length ly in the sub-scanning direction to the mask size length lx in the main scanning direction, when $N_x$ and $N_y$ are set as shown in Table 1. In the afore-described example of magnification being 50%, from the Table 1 $N_x = 11$ and $N_y = 5$, so that the mask size length lx in the main scanning direction and the mask size length ly in the sub-scanning direction re represented as follows;

$$lx = L_x N_x = 25.4/375 \times 11 = 0.745(mm)$$

$$ly = L_y N_y = 0.135 \times 5 = 0.675(mm)$$

and the ratio h, that is, the mask size length ly in the sub-scanning direction to the mask size length in the main scanning direction is represented as follows.

$$h \doteq L_y N_y / L_x N_x = 0.675/0.745 = 0.91$$

Wave shape of a sharpness emphasizing input signal of the line pattern original in the mask size length herein mentioned is shown by (d) and (e) in FIG. 7. As described the above, by setting the number of necessary pixels $N_x$ and $N_y$ (in the main and the sub-scanning directions) which fit for mask size within the range of given magnification basing on the mask size table, components of the sharpness emphasizing signals in the main scanning direction and the sub-scanning direction can be approximately equal.

TABLE 1

(Examples of the set mask sizes of $N_x$ and $N_y$ in each magnification basing on the standard which is established as $N_x = 7$ and $N_y = 7$ when magnification is 100%)

| Range of magnification | $N_x$ | $N_y$ | (Standard is N = 7) range of h |
|---|---|---|---|
| 20–30 | 15 | 5 | 1.66–1.11 |
| 31–40 | 13 | 5 | 1.24–0.96 |
| 41–50 | 11 | 5 | 1.10–0.90 |
| 51–60 | 9 | 5 | 1.09–0.92 |
| 61–80 | 7 | 5 | 1.17–0.89 |
| 81–110 | 7 | 7 | 1.24–0.90 |
| 111–140 | 7 | 9 | 1.15–0.91 |
| 141–175 | 7 | 11 | 1.11–0.89 |
| 176–200 | 7 | 13 | 1.05–0.92 |
| 201–240 | 7 | 15 | 1.06–0.89 |
| 241–300 | 5 | 15 | 1.24–1.0 |

EMBODIMENT

Figure 1:
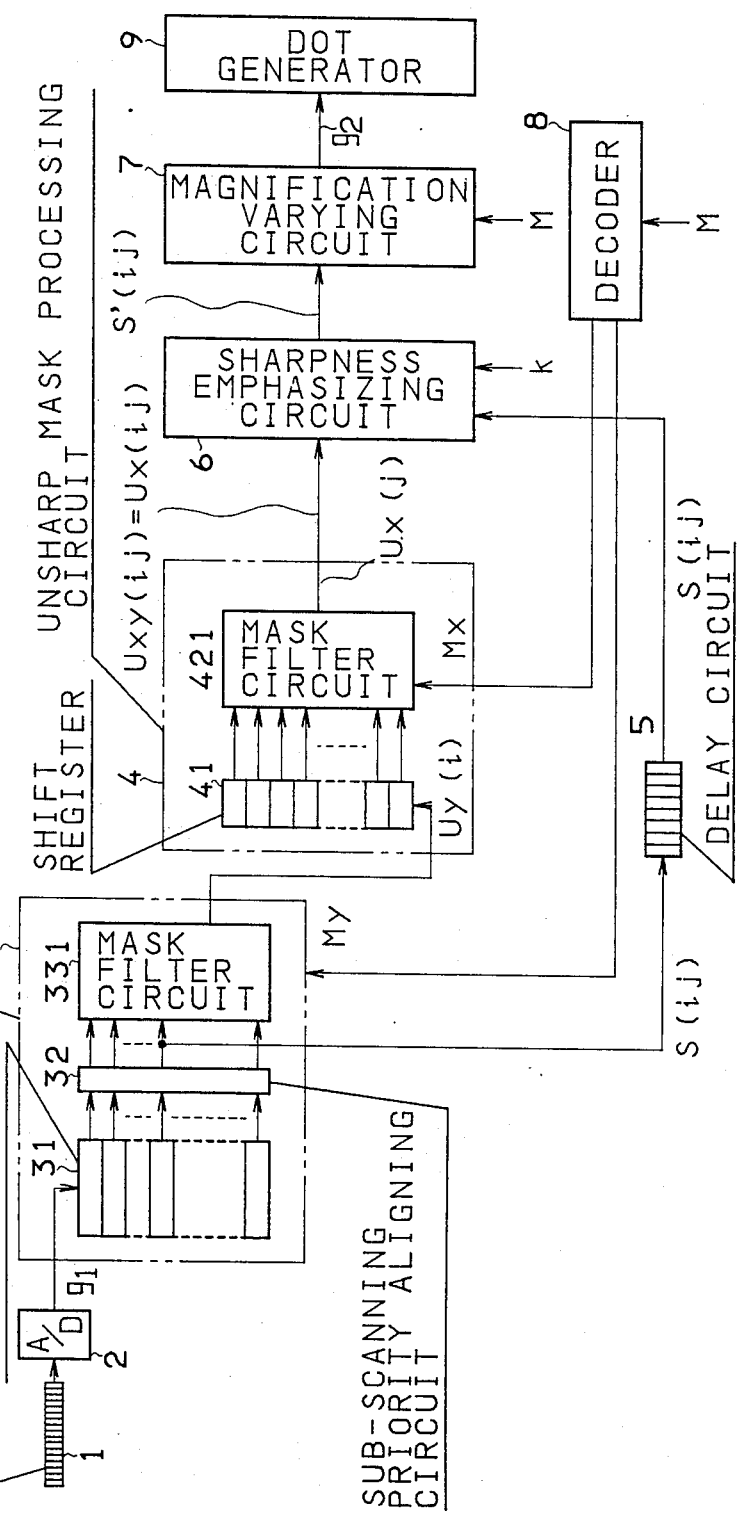
FIG. 1 is a block view showing the first embodiment of the present invention.

In FIG. 1 there is shown a concrete embodiment practicing the present invention by selectively setting the number of pixels $N_x$ in the main scanning direction and that of $N_y$ in the sub-scanning direction which fit for each of magnification range shown in the mask size table in Table 1. The whole weighting in the publication A will be explained hereinafter as 1.

The picture signal ($g_1$) is output form the CCD type linear array sensors 1, and through the A/D converter 2 input to the line memory 31 in the main scanning direction of the sub-scanning unsharp mask processing circuit 3. The unsharp mask processing circuit 3 simultaneously processes picture signals of shares of a plurality of scanning lines in the main scanning direction through the sub-scanning priority (sequence) aligning circuit 32 and a mask filter circuit 331, and outputs the vignette picture signal ($U_y(ij)$) from density information of a plurality of pixels aligning in the sub-scanning direction. The vignette picture signal ($U_y(ij)$) in the sub-scanning direction is input to the shift register 41 of appropriate stages in the unsharp mask processing circuit 4 in the main scanning direction.

The shift register 41 outputs its contents in each of the stages, that is, picture data in the respective shift stages to a mask filter circuit 421. In addition, the mask filter circuit 421 outputs the vignette picture signal(s) ($U_x(ij)$) basing on density information of a plurality of pixels aligned in the main scanning direction. Here, since the processing in the sub-scanning direction with respect to the picture signal(s) ($U_x(ij)$) has been already carried out, the picture signal(s) ($U_x(ij)$) become(s) a vignette signal(s) (unsharp signal) ($U_{xy}(ij)=U_x(ij)$) to both the main scanning and the sub-scanning directions, and then the vignette signal(s) ($U_{xy}(ij)$) is fed to the sharpness emphasizing circuit 6.

From the central line at the output side of the main scanning priority aligning circuit 32 of the unsharp mask processing circuit 3 in the sub-scanning direction, the sharp picture signal(s) ($S(ij)$) comprising a pixel train to be paid attention and to be recorded is taken out, and this sharp picture signal(s) ($S(ij)$) is fed to the sharpness emphasizing circuit 6 through the delay circuit 5.

The sharpness emphasized picture signal(s) ($S'(ij)$) having been processed in the sharpness emphasizing circuit 6 is sent to a magnification varying circuit 7. To the magnification varying circuit 7 a magnification setting value (M) is applied according to a desired magnification, and the magnification setting value (M) is also input to a decoder 8 which corresponds to the mask size table in the Table 1. The decoder 8 feeds mask size selection signals ($M_x$) and ($M_y$) which select the number of the pixels $N_y$ and that of the pixels $N_x$ to the mask filter circuits 331 and 421 in the sub-scanning and the main scanning directions. In the magnification varying circuit 7 the pixel signal(s) ($g_2$) having been thinned out and/or increased in the main scanning direction is input to a dot generator 9. The dot generator 9 records, as same as the conventional color scanner, a halftone plate picture(s).

Figure 2:
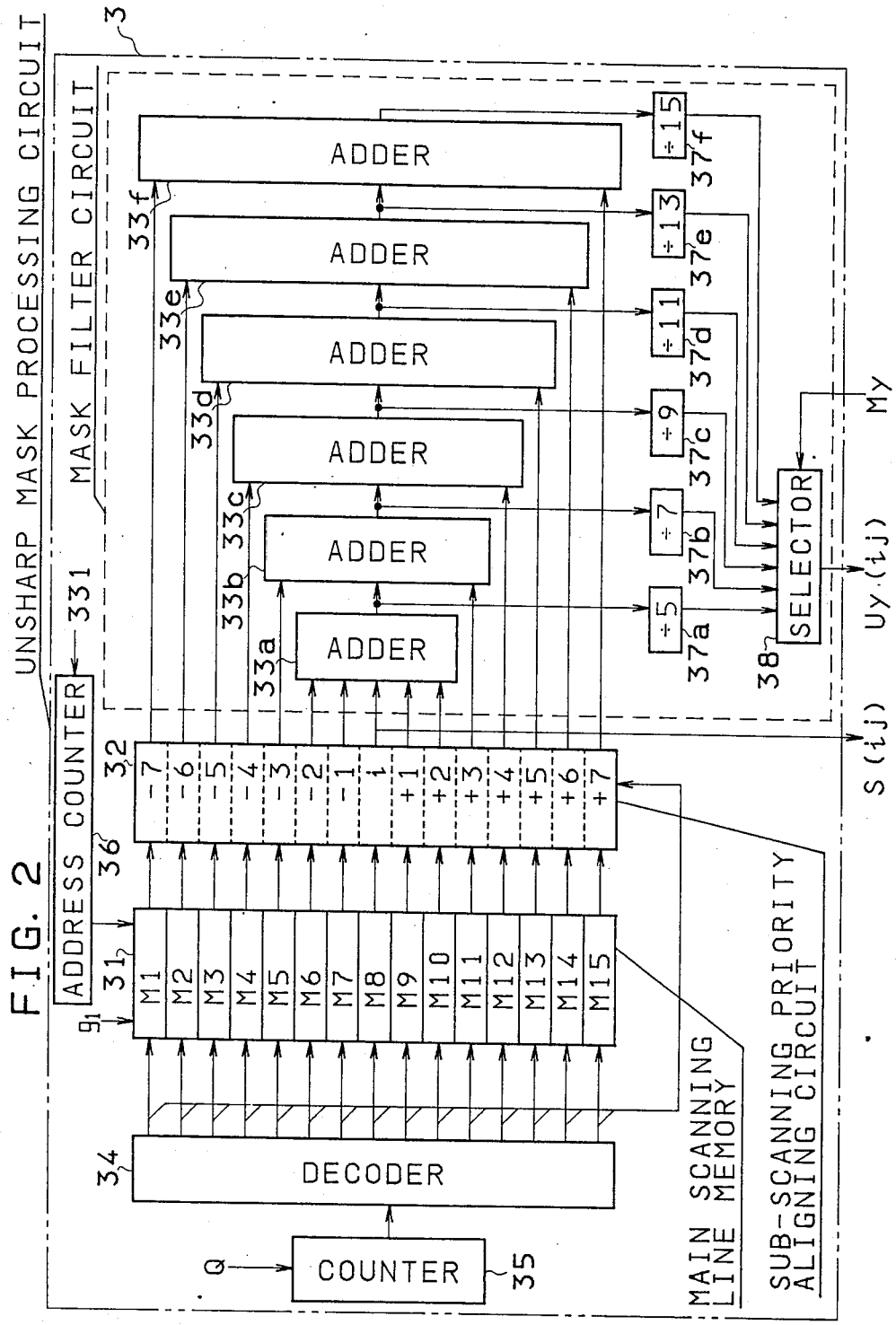
FIG. 2 is a block view showing a concrete example of an unsharp mask processing circuit shown in the sub-scanning direction shown in FIG. 1.

In FIG. 2 there is shown a concrete example of the unsharp mask processing circuit 3 in the sub-scanning direction in FIG. 1. The main scanning line memory 31 comprises a plurality of, for example, fifteen memory blocks ($M_1$), ($M_2$), ... ($M_{15}$) which record the picture signals ($g_1$) of a share of one main scanning line in synchronizing with transfer timing of the linear array sensor 1, and each of the memory blocks ($M_1$), ($M_2$), ... ($M_{15}$) is alternatively selected as a block for writing by a decoder 34 and a quindecimal counter 35. That is, at every scanning start pulse (Q) of the linear array sensor 1 applied to the quindecimal counter 35, the quindecimal counter 35 enables the memory block having recorded the oldest data to write the newest data.

When the data are read out, by an address counter 36, the memory blocks ($M_1$), ($M_2$), ... ($M_{15}$) are simultaneously addressed, and the respective read out data are input to the sub-scanning priority aligning circuit 32. The sub-scanning priority aligning circuit 32 is a circuit which aligns data according to scanning priority of the data from the newest to the oldest. In FIG. 2 an output of the newest data is shown at the uppermost part of the drawing and that of the oldest data is shown at the lowest part thereof.

The center of the sub-scanning priority aligning circuit 32 shown in FIG. 2 is an output terminal of a contour line of pixels to be emphasized, and assuming that the pixels to be emphasized are termed as ($S(ij)$), relative address i of the peripheral pixels in the sub-scanning direction become as shown in the drawing. Here, i means an absolute address in the sub-scanning direction, and j is an absolute address in the main scanning direction.

Among the outputs of the sub-scanning priority aligning circuit 32, by setting the pixel ($S(ij)$) to the center, from relative addresses [−2] to [+2] to the absolute address i are input to an adder 33a. An output of the adder 33a and relative addresses [−3] and [+3] are input to a next stage adder 33b, and thus each output of the following respective adders 33a to 33f is input to the next stage adder and each of the rear stage adders adds sequentially two addresses which are one outside of the address in the opposite directions thereto.

Each of the adders 33a to 33f sums up each of the input data, and feeds each of the outputs to each of dividers 37a to 37f. Each of the dividers 37a to 37f divides the input data according to the number of summed up data, and outputs each of additive average values. Additive average outputs of the dividers 37a to 37f are input to a selector 38, and the selector 38 selects its input alternatively according to the mask size selection signal ($M_y$) in the sub-scanning direction obtained from the decoder 8 of the mask size table which depends on the afore-mentioned magnification. The unsharp picture signal ($U_y(ij)$) in the sub-scanning direction selected by the selector 38 is fed to the unsharp mask processing circuit 4 in the main scanning direction.

From the center of the sub-scanning priority aligning circuit 32 the sharp signal ($S(ij)$) necessary for a sharpness emphasizing processing of the pixel line to be processed is taken out, and input to the delay circuit 5.

Figure 3:
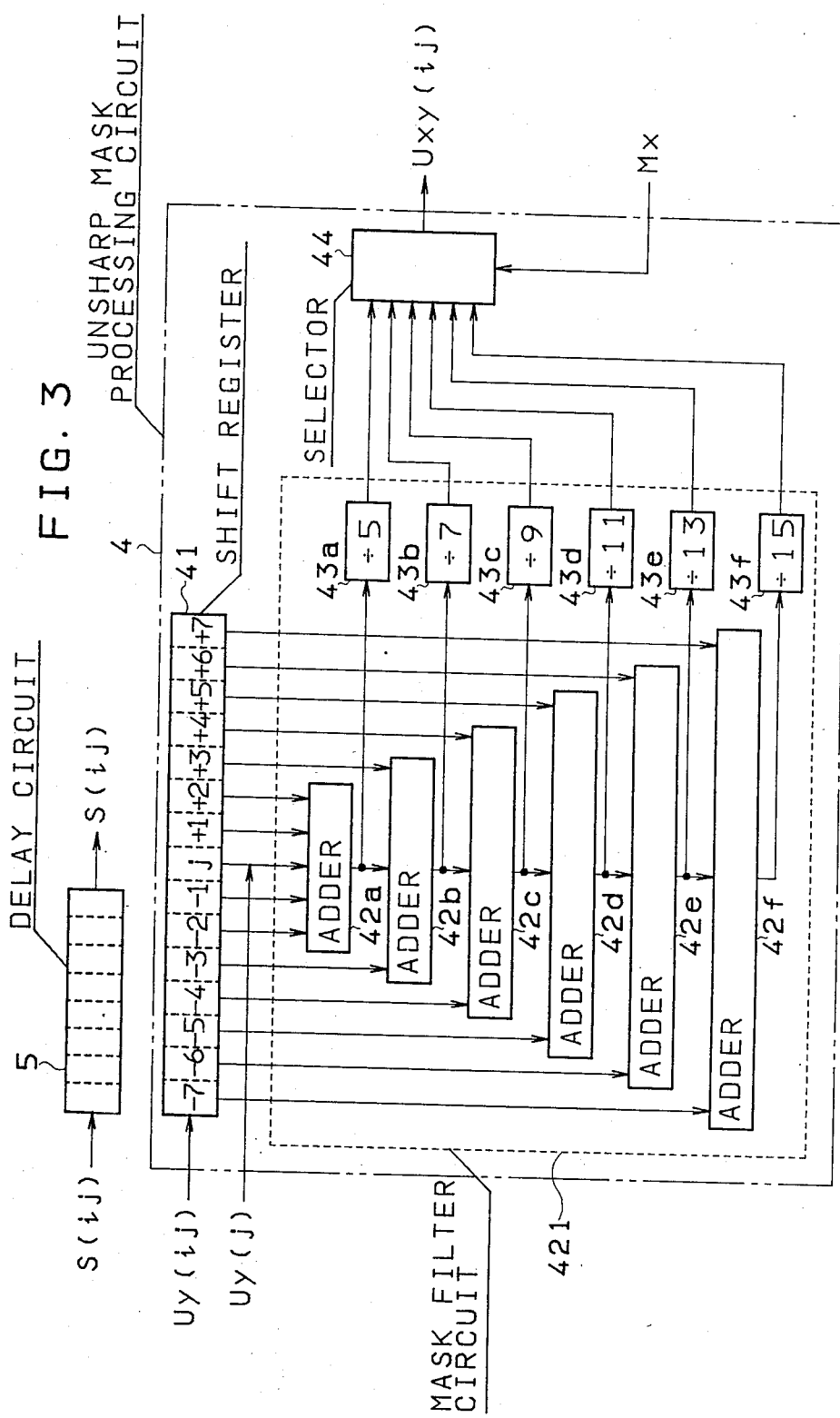
FIG. 3 is a block view a concrete example of the unsharp mask circuit in the main scanning direction in FIG. 1.

FIG. 3 is a view showing a concrete example of the unsharp mask processing circuit 4 in the main scanning direction in FIG. 1. The unsharp signal being vignetted in the sub-scanning direction is input to the shift register 41. From the central output line of the shift register 41 the unsharp signal ($U_y(ij)$) of the pixel to be processed ($S(ij)$) being vignetted in the sub-scanning direction is output, and the relative address j of peripheral pixel in the main scanning direction to the pixel ($S(ij)$) is as shown in the drawing. Each of the outputs of the shift register 41 inputs the addresses [−2] to [+2] relative to the address j to an adder 42a by centering the unsharp signal ($U_y(ij)$) being vignetted in the sub-scanning direction of the pixel, and an output of the adder 42a and relative addresses [−3] and [+3] are input to an adder 42b of the next stage. Thus, each of the outputs of the adders 42a–42f is input to the respective adders of the next adders, and the rear stage adder adds addresses which are one address to both outsides from the address having been input to the previous adder sequentially.

The output of each of the adders 42a–42f is, as same as the case of the mask filter circuit 331 in the sub-scanning, divided by the number of added data with the respective dividers 43a–43f. To each of outputting parts of the dividers 43a–43f an additive average value of data input of each of the adders 42a–42f is added, and each of the outputs is input to a selector 44. The selector 44 alternatively controls a plurality of input data by the mask size selecting signal ($M_x$) in the main scanning direction obtained from the decoder 8 of the mask size table according to said reproduction magnification, and any one of the unsharp signal ($U_{xy}(ij)$) ($=U_x(ij)$) which is output by the dividers 43a–43f selected by this selector 44 is fed to the sharpness emphasizing circuit 6.

The delay circuit 5 is a means for matching the timing of the pixel ($S(ij)$) being shifted to the center of the shift register 41, and in the embodiment a shift register of eight stages is used.

Figure 4:
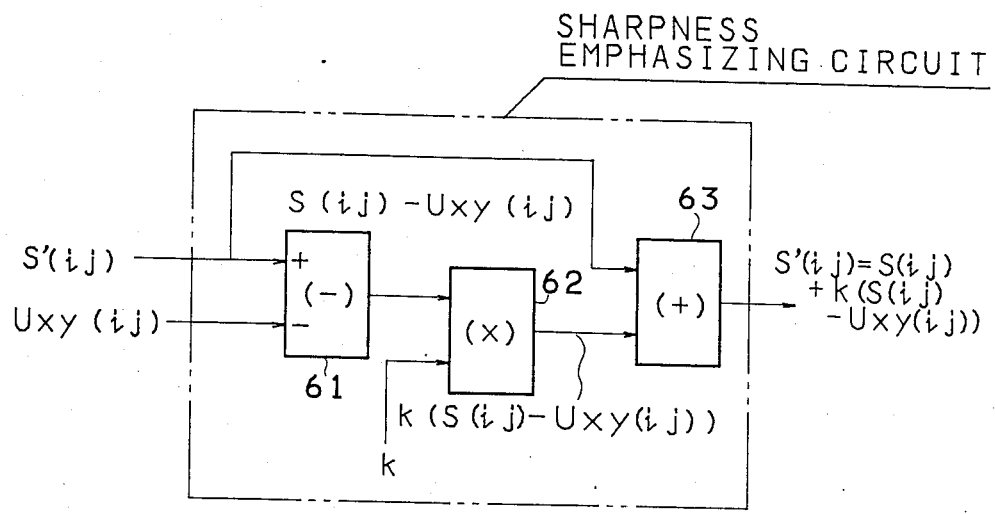
FIG. 4 is a block view showing an example of a sharpness emphasizing circuit in FIG. 1.

In FIG. 4 there is shown a concrete example of the sharpness emphasizing circuit 6, and in which operation of the expression (1) is performed. The sharpness emphasizing circuit 6 comprises a subtractor 61, a multiplier 62 and an adder 63, and outputs a sharpness picture signal (S'(ij)). This circuit has been also disclosed in the publication A.

The sharpness picture signal (S'(ij)) is thinned out and/or increased in the main scanning direction according to reproduction magnification by the magnification converting circuit 7, and when thinning out and/or increasing means are conducted, an interpolation processing is further applies for the purpose of smoothing the sharpness picture signals (S'(ij)).

Figure 5:
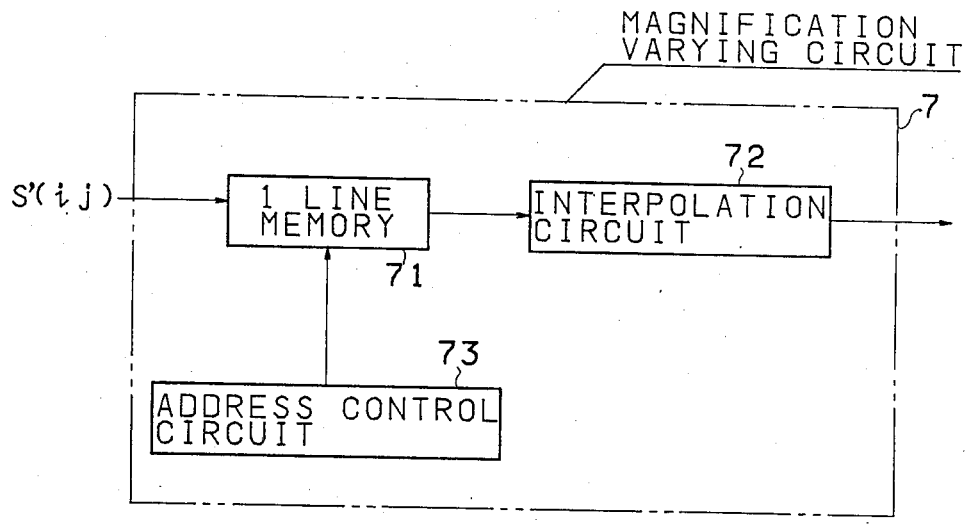
FIG. 5 is a block view showing a concrete example of a magnification converting circuit in FIG. 1.

In FIG. 5 there is shown an example of the magnification converting circuit 7 in the main scanning direction. In the magnification converting circuit 7 the sharpness picture signal (S'(ij)) output from the sharpness emphasizing circuit 6 is stored in a main scanning line memory 71 for converting magnification, and according to magnification, data are read out in the line memory 71. In the case of reducing magnification, whether data are read in thinning out manner or one thinned data is made by averaging sum of a plurality of read out data carried out is controlled according to magnification conversion, and also in the case of multiplying magnification, necessary data are read out overlappedly to convert magnification. The magnification converting circuit 7 comprises an address control circuit 73 which sets up addresses for writing or reading according to said magnification reduction or multiplication, and an output of an addressed sharpness signal (S'(ij)) in the 1 line memory by the address control circuit 73 is input to an interpolation circuit 72. In this case by interpolating several sharpness signals (S(ij)) thinned out with the interpolation circuit 72 and/or magnification conversion, then the interpolated sharpness signals are input to a dot generator 9 as picture data.

The interpolation circuit for smoothing thinned and/or increased data in response to magnification conversion is not gist of the present invention, so that description is given.

(Other Embodiment)

Figure 8:
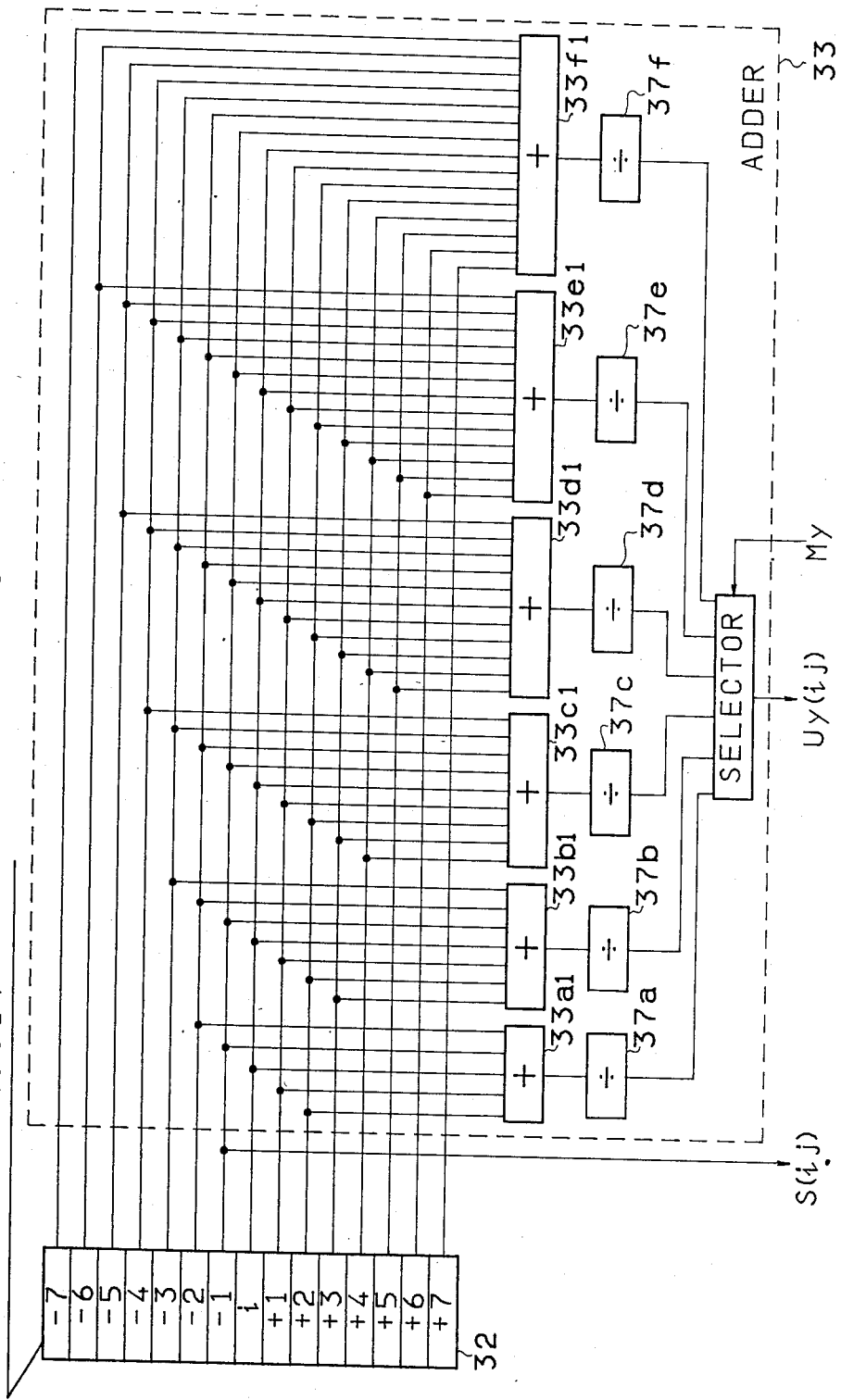
FIGS. 8 and 9 are views of another embodiment shown in FIGS. 2 and 3.
Figure 9:
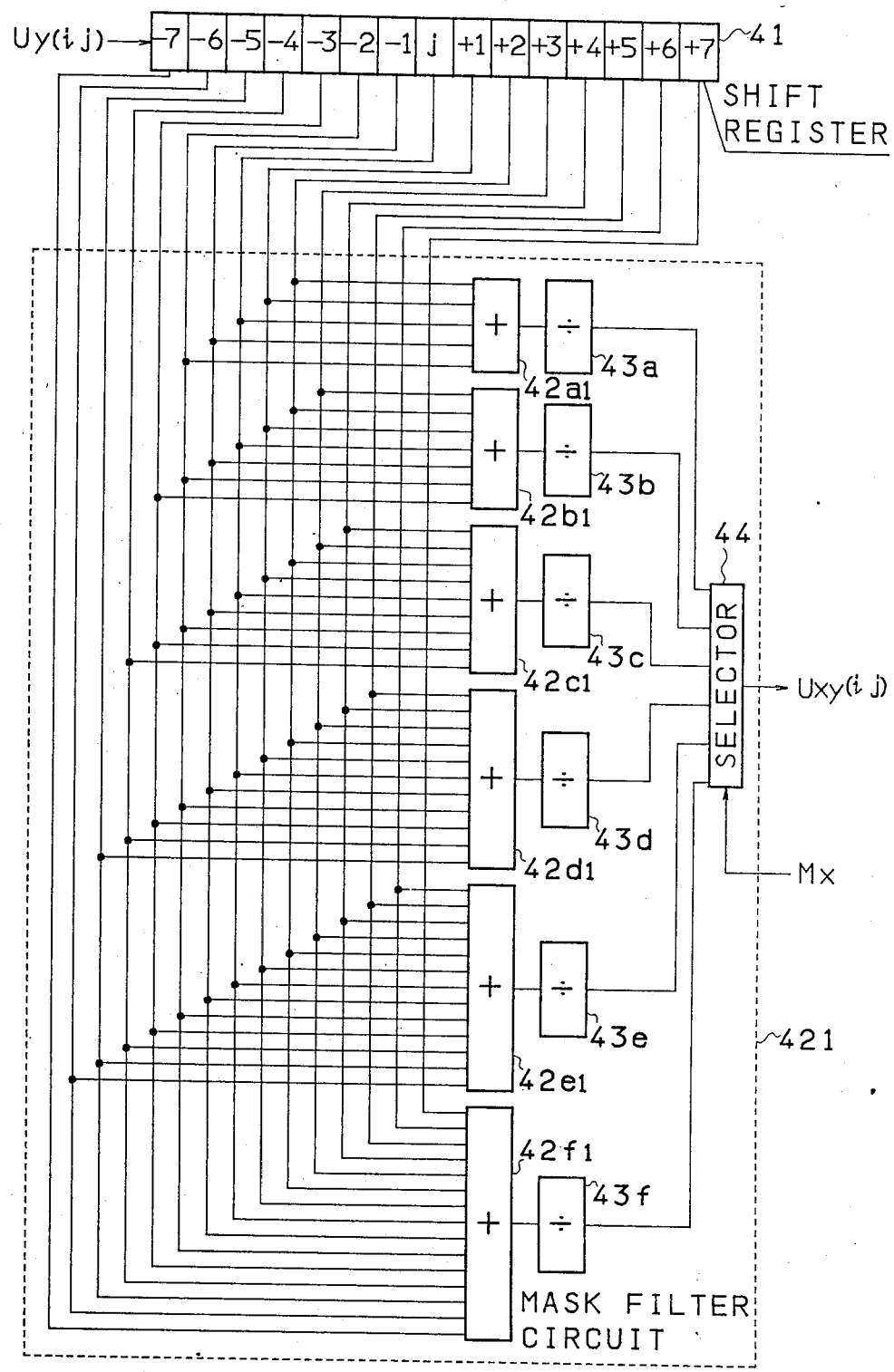

In FIGS. 8 and 9 there are shown an embodiment which differs from the embodiment having been already shown in FIGS. 2 and 3 (hereinafter, refer to the first embodiment).

The embodiment shown in FIGS. 8 and 9 is different from the first embodiment (which is shown in FIGS. 2 and 3) in the following respects, that is, in this embodiment the input signals of the adders (33a)–(33f) and (42a)–(42f) in FIGS. 2 and 3 which are the outputs of the sub-scanning priority aligning circuit 32 or the output of the shift register 41 are directly added.

Figure 10:
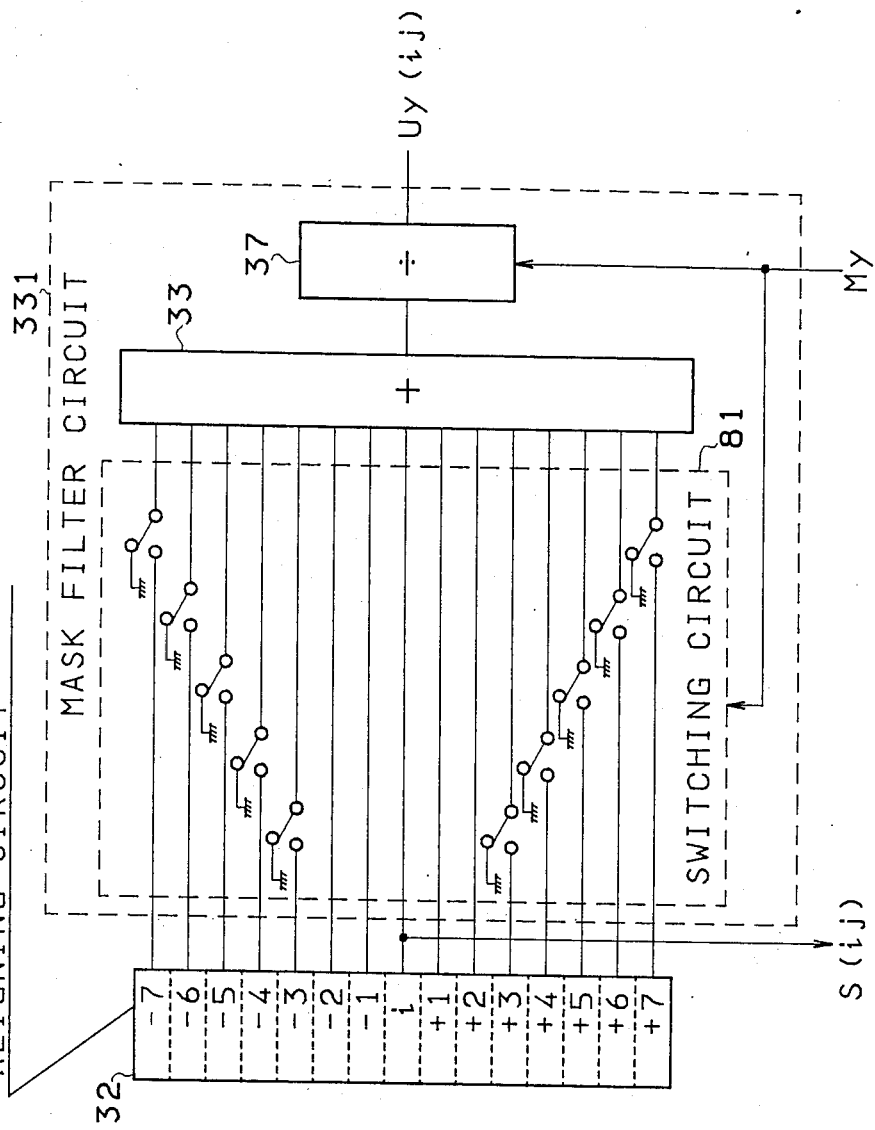
FIGS. 10 and 11 are views showing other embodiment different from that of shown in FIGS. 1, 2 and 3.
Figure 11:
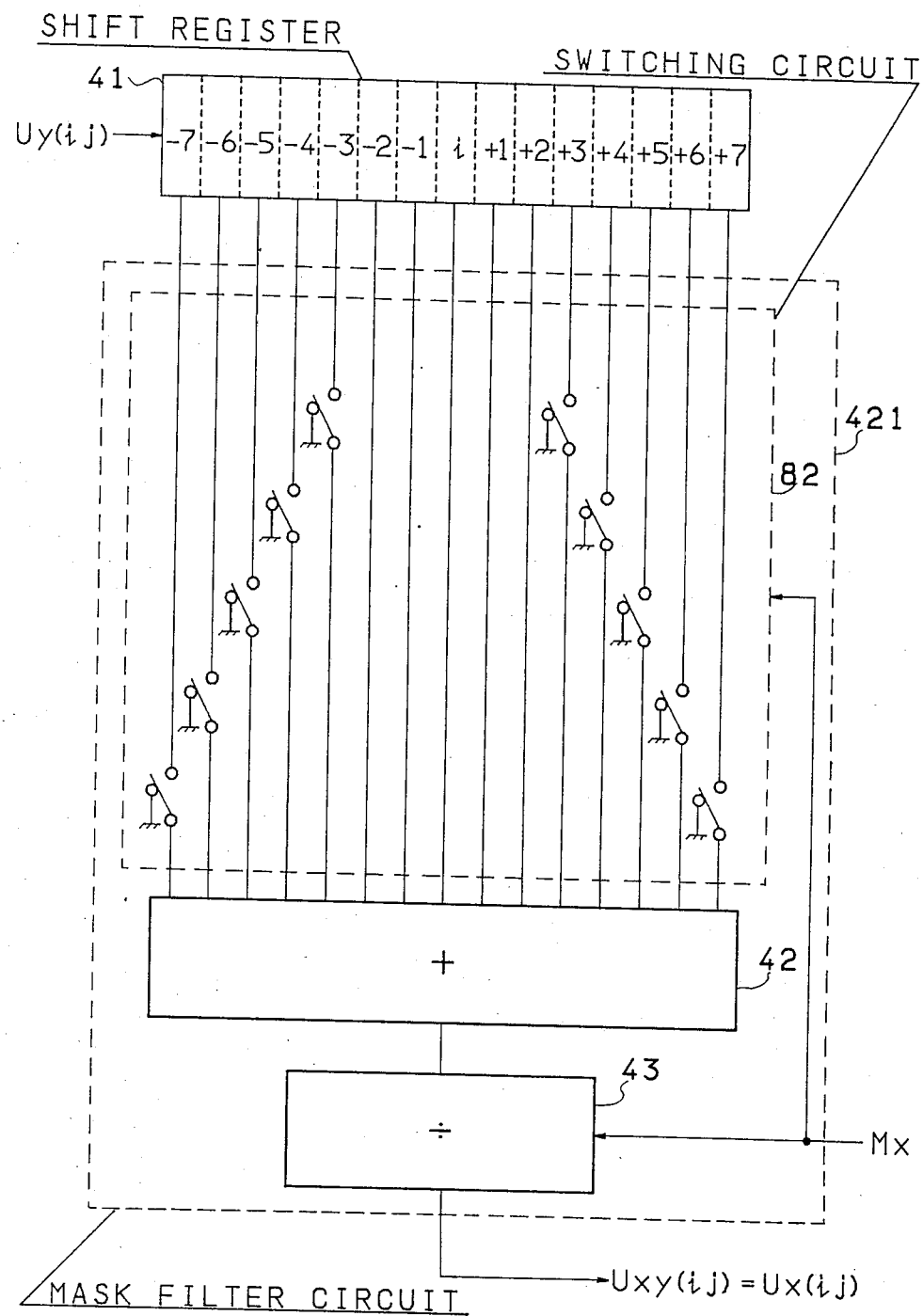

In FIGS. 10 and 11 a further embodiment different from that of shown in FIGS. 2 and 3 is shown.

In this embodiment it is also possible to set dividers, by controlling the number of added data with switching circuits 81 and 82, according to the number of the added data to the dividers 37 and 43 by $M_x$ and $M_y$. Further, as disclosed in the publication A, each of the inputs of the adders 33 and 42 may be weighted respectively, and also the dividers 37 and 43 may carry out division in accordance with weighting. Detailed descriptions have been given regarding "weighting" prior to the paragraph "OTHER EMBODIMENT", that is, in the descriptions it is assumed that all weighting is set to "1".

As described in the above, disadvantages of sharpness emphasizing eprocessing in a picture processing machine in the following three cases, that is, in the case of carrying out sharpness emphasizing processing by basing on picture information obtained form one pixel different in its sizes in the main scanning direction and in the sub-scanning direction on the original picture by applying magnification conversion method in which input resolving power in the main scanning direction is constant and input resolving power in the sub-scannig varies according to variation in magnification, and disadvantages of the emphasizing processing in the case of carrying out the processing by obtaining length of mask size of necessary vignette signals obtained basing on said pixels under the condition of the conventional number of pixels in the main and the sub-scanning directions being fixed, are clearly shown in FIGS. 7(b) and (c).

To the contrary, here in the present invention, in order to obtain a vignette signal(s) there is shown a method in which lengths of the mask size in the main scanning and the sub-scanning directions are independently set (FIGS. (d) and (c)). In addition, according to the method of present invention, in the picture processing machine, according to purpose of materials to be reproduced, for example, regarding the screen ruling in halftone plate processing, by setting lengths of mask sizes of vignette signals independently in the both main and sub-scanning directions, the optimum sharpness emphasizing processing appropriate to the screen ruling can be realized.

When the reproduced material(s) is a line drawing, according to resolving power on certain original pictures required to be particularly emphasized, the optimum sharpness emphasizing processing can be achieved by setting length of the mask sizes in the main and the sub-scanning directions independently.

Accordingly, by applying the method of the present invention, a sharpness emphasizing processing appropriate for reproduced materials produced under highly flexible conditions, that is, under conditions, such as screen ruling, mask size etc., can be realized.

EFFECTS OF THE INVENTION

As described the above, in the present invention it is adapted that mask size in the main scanning direction and that of in the sub-scanning direction of the vignette information in sharpness emphasizing are set independently, so that in the picture processing machine which, in general, produces uneven input pixel arrangement, it is possible to perform even sharpness emphasizing a processing, thus, according to the present invention a picture image(s) of good quality can be obtained.

In addition, irrespective of a manner such as an original scanning, a recording scanning etc. and/or irrespective of before and after magnification conversion processing having performed, according to the present invention, the sharpness emphasis processing can be applied to any required pictures because vignette signals can be freely set. Thus, the present invention is effective to various objects of picture processings.

What is claimed is:

1. A method for emphasizing sharpness in picture scanning recording time. in a picture reproduction machine in which a sharpness emphasizing signal is obtained by appropriately calculating a central picture signal obtained by scanning an original picture, according to the order of scanning lines, and a vignette signal obtained by adding weighted peripheral signals of the central picture signal to the central picture signal and averaging the sum, wherein desired numbers of continuous picture signals are independently selected as the peripheral signals, by setting the central picture signal to be the center, in the main and the sub-scanning directions respectively, characterized in that:

storing picture signals for a plurality of the main scanning lines sequentially, reading picture signals aligning in the sub-scanning direction out of said stored picture signals sequentially regarding the main scanning direction;

aligning said read-out picture signals according to the order of the scanning lines at each position in the main scanning direction;

averaging the sum of desired numbers of weighted picture signals by centering the central picture signal to produce a plurality of the vignette signals in the sub-scanning direction;

selecting any one of said vignette signals as a vignette signal actually used in the sub-scanning direction;

inputting, sequentially to a shift register, a plurality of actually used vignette signals in the sub-scanning direction obtained by repeating the same selection regarding the main scanning direction;

averaging the sum of desired numbers of actually used vignette signals output from said shift register by centering an actually used vignette signal output from the center of said shift register;

producing a plurality of vignette signals by adding said picture signals in the scanning direction to the vignette signals, and by obtaining a vignette signal which is actually used by selecting one vignette signal from these plurality of said vignette signals and setting it to be the peripheral picture signal; and selecting desired numbers of continuous signals in the main scanning and the sub-scanning directions independently by centering the central picture signal.

2. A method for emphasizing sharpness in picture scanning recording time in a picture reproducing machine according to claim 1, wherein according to screen ruling, line drawing means etc. in reproduction magnification and halftone dot plate processings, desired numbers of continuous picture signals by centering the central picture signal independently on the main scanning direction and the sub-scanning direction respectively.

* * * * *